United States Patent [19]

Till, Jr.

[11] Patent Number: 4,599,774

[45] Date of Patent: Jul. 15, 1986

[54] BOILER TUBE STABBING APPARATUS

[76] Inventor: Samuel B. Till, Jr., Rte. 1, Box 104, Greenville, Ala. 36037

[21] Appl. No.: 772,156

[22] Filed: Sep. 3, 1985

[51] Int. Cl.[4] ........................ B21D 53/00; B23P 15/26

[52] U.S. Cl. ........................ 29/157.4; 29/726; 29/824; 29/426.3

[58] Field of Search .................. 29/157.4, 157 R, 726, 29/727, 709, 712, 402.01, 402.03, 402.08, 455 R, 822, 823, 824, 426.1, 426.3, 426.5

[56] References Cited

U.S. PATENT DOCUMENTS 4,205,939 6/1980 Reyes .............................. 29/402.01

4,205,940 6/1980 Golick .............................. 29/402.01

4,216,893 8/1980 Glatthorn .............................. 29/726

4,329,769 5/1982 Glatthorn .............................. 29/726

*Primary Examiner*—Mark Rosenbaum

*Assistant Examiner*—Irene G. Golabi

*Attorney, Agent, or Firm*—Jennings, Carter, Thompson & Veal

[57] ABSTRACT

A tube stabbing apparatus uses a detachably mounted strongback to support a movable platform upon which a hoist assembly is carried. The platform and hoist assembly is positioned within a boiler chamber adjacent the steam drum of the boiler chamber in order to lift and position generating tubes for cooperative insertion into the steam drum. The platform and hoist assembly is movable in a horizontal plane and has a detachable boom which may be replaced with a longer boom as necessary to install each of the tubes. The entire apparatus is disassembleable to facilitate removal of the apparatus through a very small access opening in the boiler chamber.

11 Claims, 4 Drawing Figures

BOILER TUBE STABBING APPARATUS

FIELD OF THE INVENTION

The present invention relates generally to multi-drum bent tube steam boilers using steam generating tubes and more particularly relates to an apparatus for replacing or installing generating tubes in industrial boilers. Even more particularly the invention relates to removable reuseable lift apparatus for engaging individual steam generating tubes and positioning such tubes within preformed holes in the steam drum of a boiler.

BACKGROUND OF THE INVENTION

Common steam boilers utilize a plurality of drums usually including an upper steam drum and a lower mud drum. These two drums are connected by a plurality of bent tubes made from steel or some other suitable material. These tubes are connected to the drums through apertures in the skin of each drum and are generally aligned vertically beneath the steam drum and above the mud drum. In the most common applications the tubes are bent at their upper and lower ends and are reduced in diameter for a predetermined length along their terminal portions for insertion into the apertures in the drums. Each tube may weigh as much as 200 pounds. When the tubes are initially installed or if the tubes are to be replaced at some point in the life of the boiler the process is a painstaking and time-consuming chore in that it must be performed within the confines of the boiler chamber which may be inadequately ventilated. The physical labor involved in lifting each tube in what may be a 2,000 tube boiler is quite arduous. Heretofore the process has required that one or more workers physically enter the steam drum and engage one end of the bent tube through the aperture in the steam drum and manually urge the tube into position and alignment with the aperture. His co-workers would then position the lower end of the tube in an associated aperture in the top of the mud drum. The ends of the tubes are then rolled internally of the drum in a conventional manner to effect the proper seal. The process as traditionally performed requires approximately four man hours per tube to install each tube used in the boiler. Thus installing or replacing the tubes in a generating bank of a boiler traditionally requires six to eight weeks during which the boiler is obviously inoperable. In addition to being extremely time-consuming it should be noted that the lifting and positioning of these 200 pound tubes in the manner described hereinabove is an extremely precarious operation which is physically demanding on the workers and involves considerable risk of injury.

SUMMARY OF THE INVENTION

It is the object of my invention to provide an apparatus for installing boiler tubes in a safe and efficient manner. My invention accomplishes this object and overcomes the deficiencies and difficulties encountered in installing and replacing tubes in steam boilers through the advantageous utilization of an electro-mechanical lift which can be positioned within the boiler chamber to assist in lifting and positioning the tubing for insertion into the drums. My device utilizes a strongback mounted parallel to the longitudinal axis of the steam drum and supported by a pair of channel members on each end thereof with a traveling platform carried atop the strongback. The traveling platform is driven by an electrical motor and has mounted thereon an electrically driven hoist including a replaceable boom over which a cable from the hoist descends to engage the boiler tubing. The platform and boom are movable along the strongback parallel to the longitudinal axis of the steam drum. The entire strongback and platform assembly is driven along the channel members by an electric motor and a threaded arm; thus the boom supporting a tube may be positioned along the longitudinal axis of the steam drum and may be moved forwards and backwards relative to the drum along the channel members.

DESCRIPTION OF THE DRAWINGS

Apparatus embodying features of my invention are depicted in the accompanying drawings which form a portion of this application and wherein.

DESCRIPTION OF A PREFERRED EMBODIMENT

Figure 1:
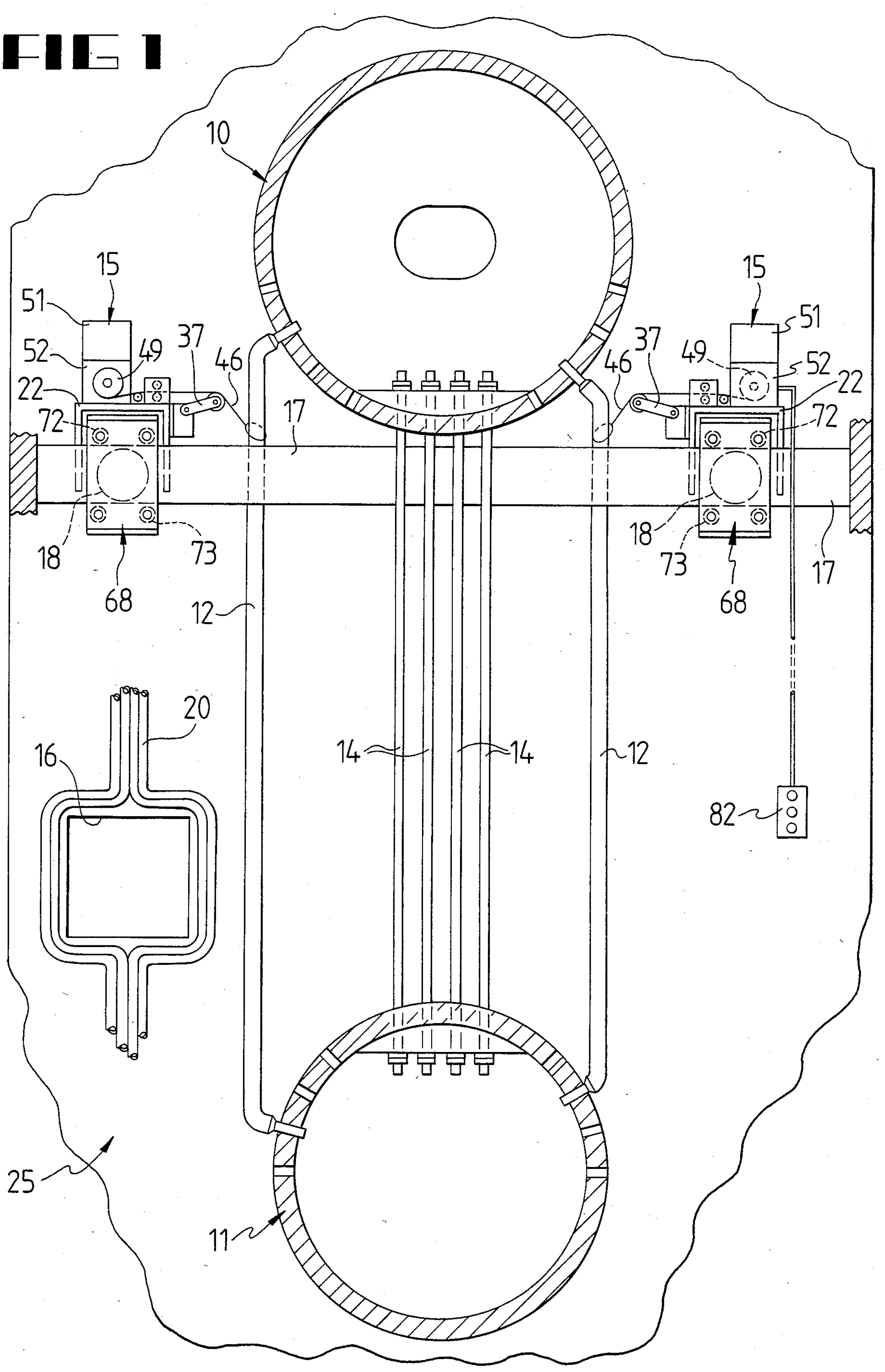
FIG. 1 is an elevational view, partly in section, showing my invention in a boiler chamber with a steam drum and mud drum connected by a plurality of tubes.

Referring to FIG. 1, a somewhat typical boiler assembly is depicted and includes a steam drum 10 which is connected to a mud drum 11 by a plurality of generating tubes 12 which are bent at their ends and decreased in diameter to fit into apertures formed in the steam drum and mud drum. As is well known in the industry these tubes must on occasion be cleaned or replaced which necessitates going into the boiler chamber and physically removing the tubes 12 from between the steam drum and mud drum and repairing or replacing the tubes. The steam drum is held in position above the mud drum during the installation or reinstallation of the generating tubes 12 by a plurality of hanger rods 14 which extend from the top of the mud drum 11 to the bottom of the steam drum 10. The configuration of the drums is conventional and is not material to the utilization of my invention except insofar as the configuration may affect the physical dimensions of the components of my apparatus which of course may be varied from boiler installation to boiler installation to meet the needs of the particular situation. It should be noted however that, as is well known in the art, when the complete bank of generating tubes is positioned between the steam drum 10 and the mud drum 11 and the water wall tubes indicated at the numeral 20 in FIG. 1 are positioned along the furnace walls 25 and any super heater tubes are also in position the amount of space remaining for ingress and egress from the chamber is quite limited. Therefore my apparatus must be properly sized for the particular installation to allow it to be removed from the boiler chamber via an access door 16 which may measure sixteen inches by eighteen inches or less.

Figure 2:
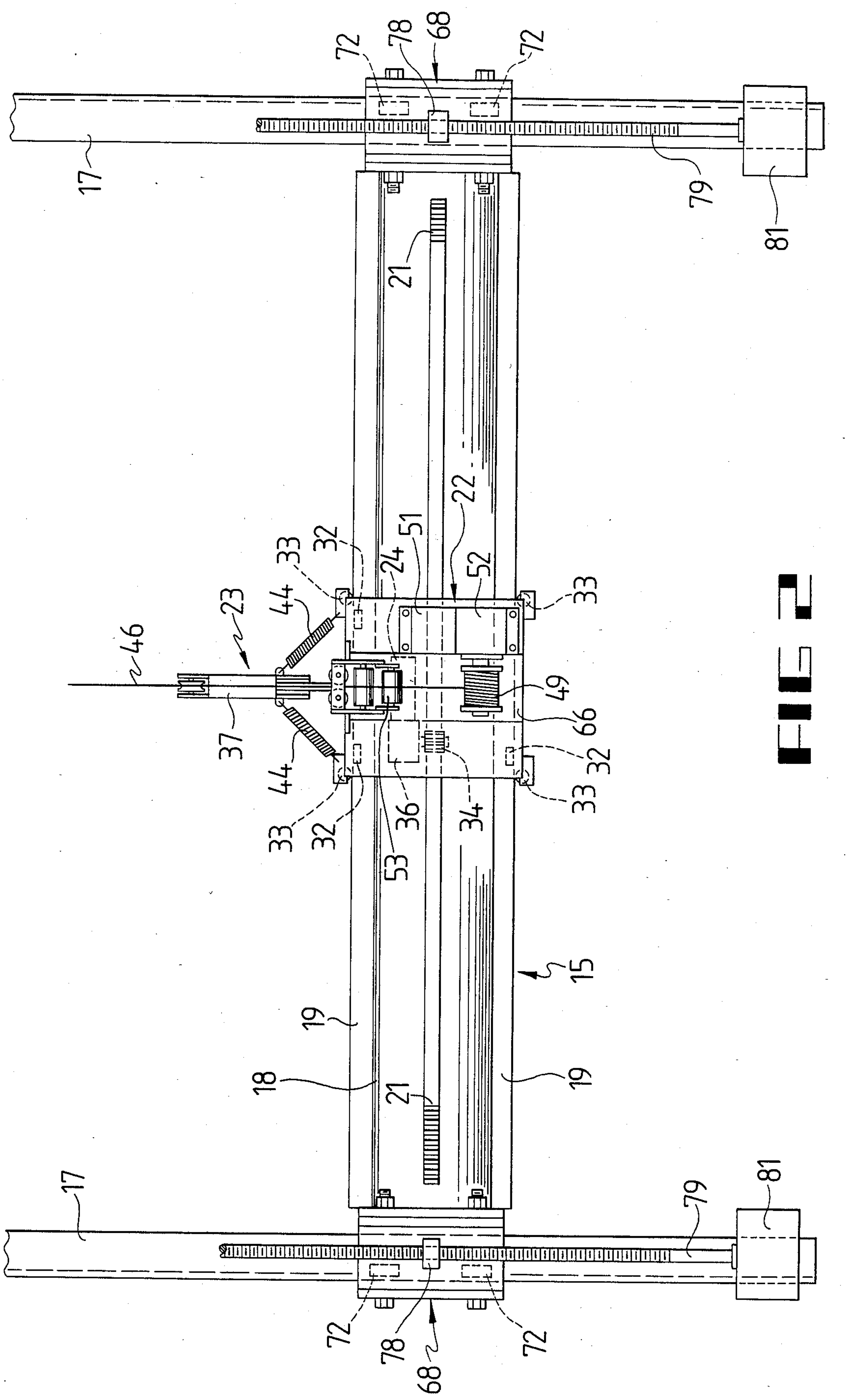
FIG. 2 is a plan view of my invention showing the boom and platform resting atop the strongback.

A ten inch channel member 17 is positioned and detachably affixed to the wall or other available structural components of the boiler chamber at each end of the steam drum 10. These channels 17 support a carriage assembly 15 which is aligned parallel to the longitudinal axis of the steam drum 10. As may be noted in the FIGS. 1 and 2 the carriage assembly uses an eight inch structural pipe or strongback 18 which has mounted on the outboard sides thereof two inch strips of square tubing 19. The top of the strongback 18 supports a rack 21 which extends along the length of the strongback 18. The two inch square tubing 19 serves as a track upon which a platform 22 is allowed to roll. The The platform 22 supports a hoist assembly 23 and is driven along the strongback 18 by a drive motor 24.

Figure 3:
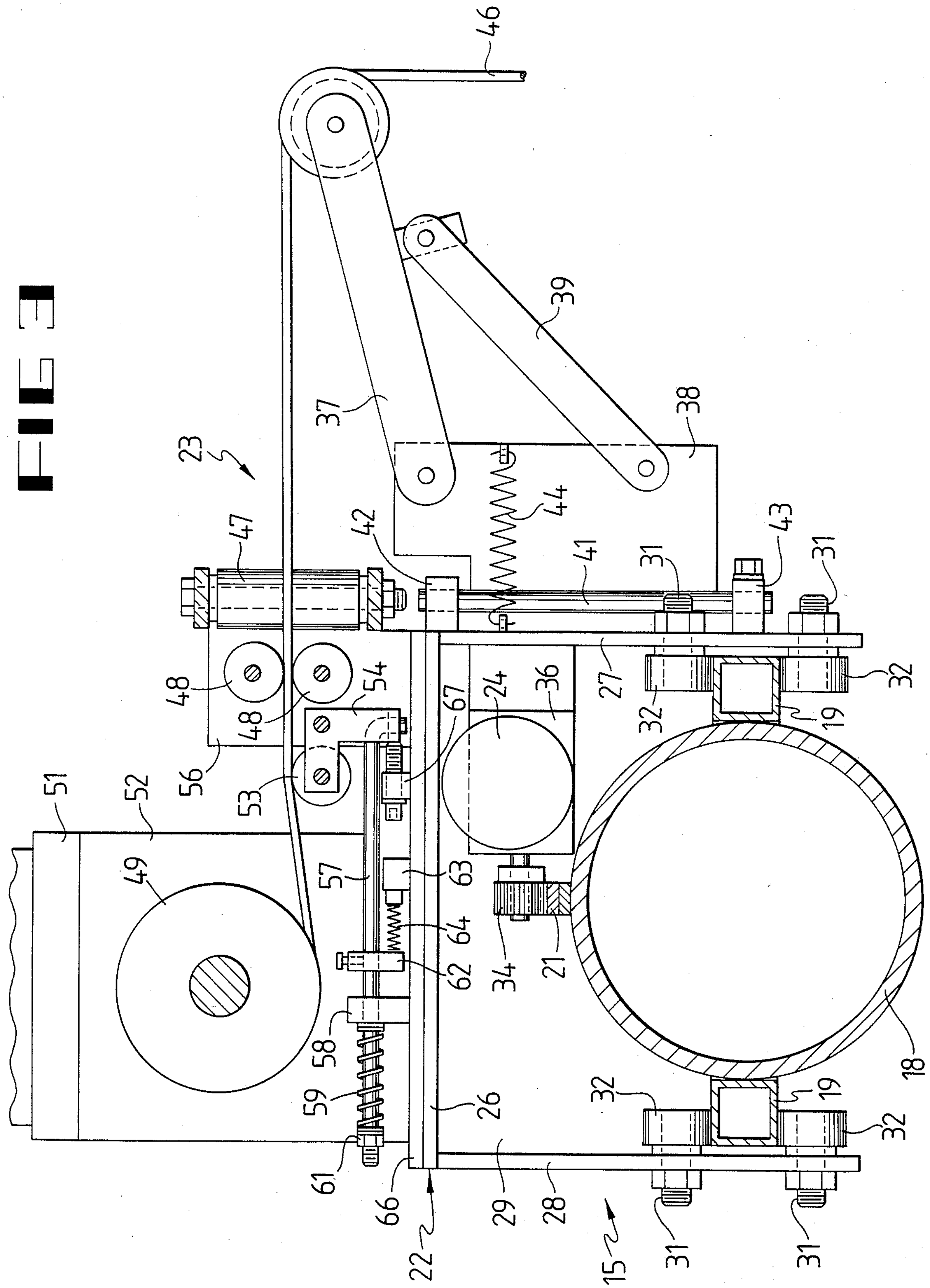
FIG. 3 is an elevational view showing the platform in section and showing the hoist mechanism mounted atop the platform.

Referring to FIG. 3 it may be seen that the platform 22 has an upper panel 26, front and rear panels 27 and 28, respectively, and end panels 29. The lower ends of the front and rear panels 27 and 28 extend below the two inch tubing 19 and are apertured to receive a plurality of axles 31, each of which carries a roller 32 which engages the upper or lower surface of the tubing 19. Positioned outboard of the front and rear panels are four clearance rollers 33 which engage the outer surface of the two inch tubing 19. This combination of load and clearance rollers assures that the platform 22 will remain on the track provided by the two inch tubing 19.

The drive motor 24 drives a pinion 34 through the use of a reducer 36 such as a Boston Model No. F310. The pinion 34 engages the rack 21 to move the platform 22 longitudinally along the strongback 18. It will of course be noted that appropriate spacers and bearings are to be used in conjunction with the various rollers and drive mechanisms to assure that the platform 24 does not bind as it moves along the strongback 18.

The hoist assembly 23 includes a replaceable boom 37. The boom 37 may be manufactured in various lengths which may be interchanged with the remainder of the assembly 23 as needed to position the tubes 12 in the boiler. As shown in FIG. 3, the boom 37 is affixed to a hinge plate 38 by a brace 39. The hinge plate 38 is connected to a hinge rod 41 which is positioned vertically along the center of the front panel 27 where it is held by an upper bearing 42 welded to front panel 27 and a detachable bearing 43 affixed to the front panel 27 at the opposite end of the hinge rod 41. The boom 37 is thus free to pivot about a vertical line corresponding to the center of the hinge rod 41. A pair of centering springs 44 attached to each side of the hinge plate 38 hold the boom 37 in a center position; however, the springs 44 allow the boom 37 to move to an off-center position as necessary to facilitate the placement of the tubes 12 in the steam drum 10 and mud drum 11.

Inasmuch as the boom 37 will be free to pivot about this vertical line and since a cable 46 is used in conjunction with the boom to raise the tubes 12 into engagement with the steam drum 10, it is necessary to provide some means to maintain the cable 46 in centered alignment with the boom 37. I accomplish this through the use of a plurality of vertical and horizontal guide rollers including a pair of vertically disposed guide rollers 47 operably connected to a frame element 56 carried by the platform 22 and positioned to pass the cable 46 through a space between the vertically disposed guide rollers 47 which is aligned directly above the hinge rod 41. Positioned directly behind the vertically disposed guide rollers 47 are a pair of horizontally disposed guide rollers 48 which allow cable 46 to pass through a horizontal space between the rollers 48 and maintain the cable at a constant elevation with respect to the boom 37. The combined action of these vertically and horizontally disposed guide rollers restrain transverse movement of the cable 46 so that it maintains constant alignment with the boom 37 and thus enhances the stability of the operation of the boom.

The cable is raised or lowered by the action of a rotatable hoist drum 49 which is driven by a reversible electric motor 51 such as a one and one-half horsepower Nima type C face mounted variable speed motor with the self-included electric brake. A reducer 52 such as a Boston model No. F321X worm gear drive serves as the interface between the motor 51 and the hoist drum 49. A load control roller 53 is positioned between the hoist drum 49 and the horizontally disposed guide rollers 48. The load control roller 53 is positioned such that the cable 46 is in running contact with the roller 53, that is to say, the cable 46 traverses the surface of the roller 53 and causes the roller to rotate prior to entering the space between the horizontally disposed guide rollers 48. This interaction of the cable with the load control roller 53 causes a slight deflection in the cable between the drum 49 and the guide rollers 48 so that the path of the cable from the drum to the horizontal guide rollers 48 is not exactly straight. The load control roller 53 is mounted on an L-shaped pivot arm 54 which pivots on the frame element 56 which is used to support the horizontally disposed guide rollers 48, thus the stress placed on the cable 46 by being loaded with a tube 12 causes a downward force to be exerted on the load control roller 53.

A load control rod 57 is affixed to the lower portion of the pivot arm 54 and extends along the top of the platform 22 towards the drum 49. The rod 57 passes through an aperture in a stop 58 and has a load control spring 59 mounted coaxially thereon and retained thereon by a threaded nut and washer combination 61. The spring 59 is thus captured between the end of the load control rod 57 and the stop 58 thereby biasing the load control roller 53 upwards in opposition to the downward forces generated by the cable 46. By adjusting the tension in the load control spring 59 the force emerted on the cable 46 necessary to cause the downward movement of the load control roller 53 may be varied.

Also operably connected to the load control rod 57 is an actuator 62 which serves to trigger a limit switch 63 which in turn deenergizes the motor 51 and applies the motor's electric brake. The actuator 62 includes a limit spring 64 which is used to avoid damage to the limit switch 63 due to relative motion of the actuator 62 in response to movement of the load control roller 53. It should be noted that the entire hoist assembly 23, except for the boom 37 and its braces and supports, is mounted on a plate 66 which is affixed to the top panel 26 of the platform 22 so that the cable centering section and the load control section can be removed from the platform 22 in order to pass through the exit door 16 without complete disassembly of all of the components.

An adjustable stop 67 is mounted on the plate 66 proximal the L-shaped pivot arm 54 in order to vary the initial setting of the load control roller 53. It is recommended that the sensitivity of the load control roller 53 be set such that a force on the cable equivalent to the weight of the heaviest tube in the generating bank plus fifty pounds would cause the load control roller 53 to pivot a sufficient distance to cause the limit switch 63 to stop the motor 51. This would prevent the inadvertent breakage of the cable and the consequent deformation and damage of the tube in the event a tube is improperly positioned in the steam drum 10.

Figure 4:
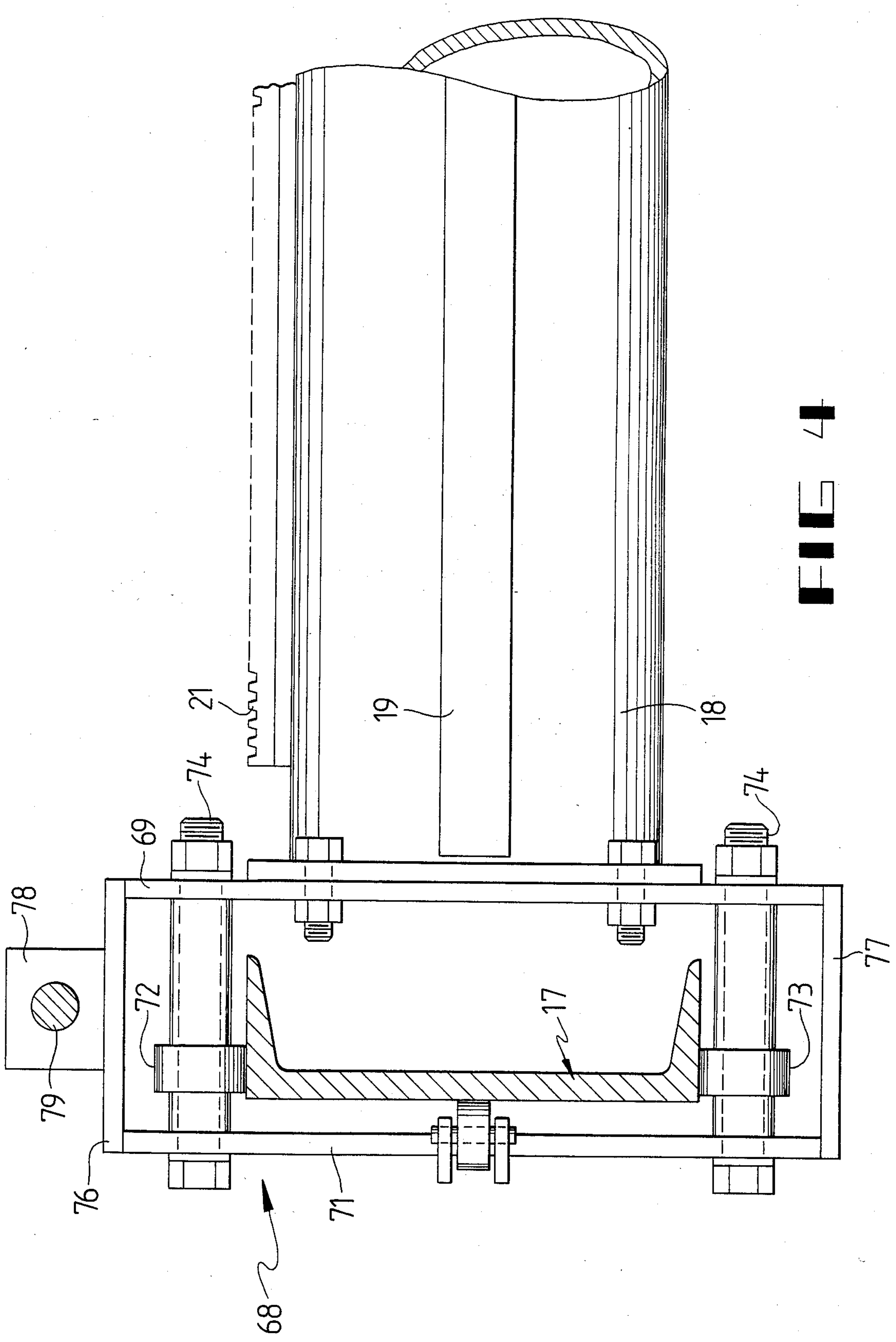
FIG. 4 is a sectional view of one of the mounting channels showing the traveling assembly engaged thereon.

As shown in FIG. 4, each strongback 18 is connected to the channel members 17 at each end by a traveling assembly 68 which includes an inner and outer plate 69 and 71, respectively, disposed vertically on the inner and outer sides of the channel member 17. Intermediate the inner and outer plates are a pair of upper travel rollers 72 and a pair of lower travel rollers 73. These travel rollers are connected to the inner and outer plates 69 and 71 by individual axles 74 and are in rolling engagement with the upper and lower surfaces respectively of the channel member 17. A top and bottom plate 76 and 77 also connect the inner and outer plates. Each travel assembly 68 has a threaded tab 78 thereon which receives a power transmission screw 79 driven by a positioning electric motor 81. Clearly, to avoid a binding effect, the rotation of the transmission screw on each travel assembly 68 at the ends of the strongback 18 must be synchronized. The positioning electric motor 81, the hoist electric motor 51 and the drive motor 24 are all controlled from an operably connected hand controller 82, shown in FIG. 1, which allows an operator to direct the positioning electric motor 81 to position the strongback 18 relative to the steam drum 10 and also to position the platform 22 along the length of the strongback 18 in order to employ the hoist electric motor 51 to raise a tube 12 into cooperative position with the steam drum 10.

My apparatus may be utilized either to repair and replace preexisting tubes or to install new tubes in a boiler. In a preexisting boiler in which the generating tubes must be replaced, normally access to the boiler chamber will be restricted to the access door 16. The strongback 18 and channel members 17 are passed to the interior of the boiler through the access door 16 as is the platform 22 and hoist assembly 23. The channel members 17 are detachably affixed to the walls of the boiler structure and the traveling assembly 68 is used to affix the strongback 18 to the channel members. It may be noted that a separate strongback 18 may be installed on either side of the steam drum 10 such that two crews may work simultaneously to install generator tubes 12 on each side of the steam drum 10. The platform 22 with the hoist assembly 23 positioned on it is set in place on the strongback 18 and electrical current is supplied to the motors. The range of travel of the platform 22 is from one end of the strongback 18 to the other; however it may be noted that the hoist assembly 23 has its boom 37 affixed in the middle of the platform 22 whereby it may be necessary for the boom 37 to pivot about its vertical axis of rotation to place tubes 12 in the apertures in the steam drum. Furthermore it should be noted that it is likely that the present invention will not be extremely useful in placing tubes in the two outermost apertures in each row of apertures in the steam drum 10 inasmuch as the channel members 17 must be positioned against the outer walls of the chamber which would interfere with the ability of the platform 22 and the hoist assembly 23 to position each of these tubes in their proper hole at or near each end of the strongback. One worker is still required to enter the steam drum 10 and to remain therein until the tubes are positioned; however his function is no longer to raise the tube into position but rather to secure the end of the tube 12 once it has been properly raised and positioned by my apparatus. A second worker utilizes the hand control 82 to position the travel assembly 68 relative to the steam drum 10 and to move the platform 22 and hoist assembly 23 along the strongback 18 to position the end of the boom 37 in cooperative relationship to the aperture associated with the next tube to be placed in the steam drum 10. This worker utilizes the hand control 82 to lower the cable 46 from the boom 37 and to loop the cable 46 around the upper extremity of the tube 12 such that the tube 12 may be raised by hoist assembly 23. The hoist assembly 23, platform 22 and travel assembly 68 may be cooperatively utilized not only to raise the tube 12 into close proximity to the aperture in the steam drum 10 but also may be used to lift and push the tube into the aperture thereby stabbing the tube 12 into the aperture mechanically rather than by the heretofore relied on manual means. Once the upper end of the tube 12 is positioned within the steam drum 10 the second worker can position the lower end of the tube 12 in the mud drum 11 manually and the tube may be lowered slightly such that both ends of the tube fit within apertures within the steam drum and mud drum. The tubes 12 may then be placed sequentially in each succeeding hole in a particular row of apertures in the steam and mud drums in a very rapid and efficient manner. The succeeding row of apertures may be filled with generating tubes in the same manner until the complete bank of tubes has been replaced or installed. It is believed that a crew of three men utilizing one in the steam drum, one operating the controls to the apparatus, and one receiving pipe can stab a tube 12 in the steam and mud drums in approximately thirty seconds, thus a two thousand tube generating bank may have all the tubes installed therein in one week contrary to the six to eight weeks which were typical in the prior art. After all of the tubes in the generating bank which are to be installed by use of my apparatus have been properly stabbed, the apparatus is disassembled and removed from the boiler chamber through the access door.

While I have shown my invention in but one form, it will be obvious to those skilled in the art that it is not so limited, but is susceptible of various changes and modifications without departing from the spirit thereof.

What I claim is:

1. Apparatus for replacing tubes in a multiple-drum bent-tube bolier having at least a steam drum and a mud drum comprising:

(a) hoist means located externally of said steam drum and mud drum for raising one end of each of said tubes into cooperative alignment with said steam drum;

(b) carraige means for moving said hoist means and any tube supported thereby along a line parallel to the longitudinal axis of said steam drum and externally thereof; and (c) positioning means for moving said carriage means relative to the exterior of said steam drum in a plane passing through said parallel line.

2. Apparatus as defined in claim 1 wherein said positioning means comprises:

(a) means for supporting said carriage means in said horizontal plane; and (b) reversable drive means for moving said carriage means toward and away from said steam drum.

3. Apparatus for replacing tubes in a multiple-drum bent-tube boiler having at least a steam drum and a mud drum comprising:

(a) hoist means for raising one end of each of said tubes into cooperative alignment with said steam drum including a reversible electric motor, a cable operably connected to said motor, and a replaceable cable boom supported by said carriage means and extending therefrom toward said steam drum with said cable operably connected thereto;

(b) carriage means for moving said hoist means and any tube supported thereby along a line parallel to the longitudinal axis of said steam drum, and (c) positioning means for moving said carriage means in a horizontal plane passing through said parallel line.

4. Apparatus as defined in claim 3 further comprising means responsive to a predetermined force extended on said cable for stopping said reversible electric motor.

5. Apparatus as defined in claim 4 further comprising:

(a) a rotatable load control roller positioned intermediate said boom and said motor with said control roller urged in running contact against said cable and being operably connected to said carriage for displacement along a line perpendicular to the axis of rotation of said roller responsive to a predetermined force exerted thereon by said cable; and (b) means for stopping said electric motor responsive to said displacement.

6. Apparatus as defined in claim 3 further comprising:

(a) means for mounting said boom to said carriage for pivotal motion about a vertical axis; and (b) means for constantly centering said cable on said boom.

7. The apparatus as defined in claim 6 wherein said means for centering comprises:

(a) a pair of horizontally disposed guide rollers positioned intermediate said motor and said boom with said cable passing between said rollers; and (b) a pair of vertically disposed guide rollers positioned intermediate said motor and said boom with said cable passing between said vertically disposed guide rollers.

8. Apparatus for replacing tubes in a multiple-drum bent-tube boiler having at least a steam drum and a mud drum comprising:

(a) hoist means for raising one end of each of said tubes into cooperative alignment with said steam drum;

(b) carriage means for moving said hoist means and any tube supported thereby along a line parallel to the longitudinal axis of said steam drum including a support member extending parallel to the longitudinal axis of said steam drum, a platform member supported in rolling engagement on said support member and operably connected to said hoist means, and drive means for selectively moving said platform member along said support member parallel to said steam drum; and (c) positioning means connected to each end of said support member for moving said carriage means in a plane passing through said parallel line.

9. Apparatus as defined in claim 8 wherein said drive means comprises:

(a) a rack element extending along the surface of said support member;

(b) a reversible electric motor operably connected to said platform member; and (c) a pinion element driven by said motor and engaging said rack to move said platform along said support member.

10. Apparatus for replacing tubes in a multiple-drum bent-tube boiler having at least a steam drum and a mud drum comprising:

(a) hoist means for raising one end of each of said tubes into cooperative alignment with said steam drum;

(b) carriage means for moving said hoist means and any tubes supported thereby along a line parallel to the longitudinal axis of said steam drum including a horizontal elongated strongback extending along said line parallel to said steam drum, a platform supported by said strongback and engaging said strongback for movement thereon, a reversible electric motor operably connected to said platform, means for moving said platform driven by said motor and engaging said strongback; and (c) positioning means connected to each end of said strongback for moving said carriage means in a plane passing through said parallel line.

11. Apparatus for replacing tubes in a multiple-drum bent-tube boiler having at least a steam drum and a mud drum comprising:

(a) hoist means for raising one end of each of said tubes into cooperative alignment with said steam drum;

(b) carriage means for moving said hoist means and any tube supported thereby along a line parallel to the longitudinal axis of said steam drum; and (c) positioning means for moving said carriage means in plane passing through said parallel line including a pair of elongated channel members detachably affixed to the walls of said boiler and extending perpendicular to the longitudinal axis of said steam drum, a travel assembly supported on each channel member for rolling movement thereon and operably connected to support said carriage means, a reversible electric motor, and a reversible power transmission screw operably connected to said motor and said travel assembly for urging said assembly along said channel members.

* * * * *